US012618360B2

(12) United States Patent　　　　　(10) Patent No.: US 12,618,360 B2
Sarkar et al.　　　　　　　　　　　　　(45) Date of Patent: May 5, 2026

(54) LIQUID HYDROGEN PUMPING SYSTEM

(71) Applicant: Eaton Intelligent Power Limited,
Dublin (IE)

(72) Inventors: Subrata Sarkar, Pune (IN); Andrew John Masson, Hedge End (GB); Sandip Balasaheb Gaikwad, Pune (IN)

(73) Assignee: Eaton Intelligent Power Limited,
Dublin (IE)

( * ) Notice: Subject to any disclaimer, the term of this patent is extended or adjusted under 35 U.S.C. 154(b) by 0 days.

(21) Appl. No.: 18/894,953

(22) Filed: Sep. 24, 2024

(65) Prior Publication Data

US 2025/0101910 A1　　Mar. 27, 2025

(30) Foreign Application Priority Data

Sep. 27, 2023　(IN) ............................. 202311064844

(51) Int. Cl.
*F02C 7/12*　　　(2006.01)
*B64D 37/30*　　(2006.01)
*F02C 3/22*　　　(2006.01)
*F02C 7/22*　　　(2006.01)
*F02C 7/224*　　(2006.01)

(52) U.S. Cl.
CPC ................. *F02C 3/22* (2013.01); *F02C 7/12* (2013.01); *F02C 7/22* (2013.01); *F02C 7/224* (2013.01); *B64D 37/30* (2013.01); *F05D 2220/323* (2013.01)

(58) Field of Classification Search
CPC .. F04D 29/5806; F04D 29/586; F04D 29/588;

F04D 13/06; F02C 7/22; F02C 3/22;
F02C 9/32; F02C 7/12; B64D 37/30;
F05D 2220/323; F05D 2260/213
See application file for complete search history.

(56) References Cited

U.S. PATENT DOCUMENTS

| | | | | |
|---|---|---|---|---|
| 5,101,621 | A * | 4/1992 | Mutch | B64D 29/00 |
| | | | | 428/116 |
| 6,561,773 | B1 * | 5/2003 | Fischer | F04B 53/08 |
| | | | | 123/497 |
| 8,291,944 | B2 | 10/2012 | Allidieres | |
| 9,765,762 | B2 | 9/2017 | Papirer et al. | |
| 11,041,439 | B2 | 6/2021 | Roberge | |
| 11,674,443 | B2 * | 6/2023 | McCurdy Gibson | F02C 3/22 |
| | | | | 60/736 |

(Continued)

FOREIGN PATENT DOCUMENTS

| | | |
|---|---|---|
| CN | 207691570 U | 8/2018 |
| JP | 2021007285 A | 1/2021 |
| WO | 2024133533 | 6/2024 |

OTHER PUBLICATIONS

European Extended Search Report for European Patent Application 24202519.5 dated Feb. 26, 2025, 7 pages.

*Primary Examiner* — Rodolphe Andre Chabreyrie
(74) *Attorney, Agent, or Firm* — Merchant & Gould P.C.

(57) ABSTRACT

The present disclosure relates to hydrogen pumping systems for pumping hydrogen from a fuel tank (where the hydrogen is stored as liquid hydrogen LH2) to a power generation device at which the hydrogen is used as fuel. The pumping systems include features providing system redundancy, effective heat exchange for warming the hydrogen, gas turbine air bleed cooling, component cooling and removal of hydrogen gas.

14 Claims, 3 Drawing Sheets

(56)          References Cited

U.S. PATENT DOCUMENTS

| | | | | |
|---|---|---|---|---|
| 11,851,210 | B2 * | 12/2023 | Kawai | B64F 1/28 |
| 11,873,768 | B1 * | 1/2024 | Dindar | F02C 9/40 |
| 11,952,944 | B1 * | 4/2024 | Niergarth | F02C 7/224 |
| 12,006,878 | B2 * | 6/2024 | Brady | F02C 7/143 |
| 12,147,207 | B2 * | 11/2024 | Shimizu | G05B 19/042 |
| 2010/0089026 | A1 * | 4/2010 | Baker | F02C 9/30 |
| | | | | 137/565.29 |
| 2010/0266923 | A1 | 10/2010 | Mcelroy et al. | |
| 2013/0186059 | A1 | 7/2013 | Epstein et al. | |
| 2015/0300260 | A1 | 10/2015 | Wollenweber | |
| 2016/0195013 | A1 * | 7/2016 | Epstein | C10L 10/08 |
| | | | | 60/39.463 |
| 2020/0088099 | A1 * | 3/2020 | Roberge | F02C 7/224 |
| 2021/0010430 | A1 * | 1/2021 | De Wergifosse | F02C 7/32 |
| 2021/0079848 | A1 * | 3/2021 | Cocks | F02C 7/236 |
| 2023/0045911 | A1 | 2/2023 | Smith | |
| 2023/0076951 | A1 * | 3/2023 | Smith | F02C 7/32 |
| 2023/0250754 | A1 | 8/2023 | Muldoon | |
| 2023/0339621 | A1 | 10/2023 | Sarkar | |
| 2024/0018974 | A1 | 1/2024 | Sarkar et al. | |

* cited by examiner

LIQUID HYDROGEN PUMPING SYSTEM

CROSS-REFERENCE TO RELATED APPLICATIONS

This application claims the benefit of Indian Provisional Patent Application No. 202311064844, filed Sep. 27, 2023, which is incorporated by reference herein in its entirety.

TECHNICAL FIELD

The present disclosure relates to fuel systems such as fuel systems used for aircraft.

BACKGROUND

The use of hydrogen can potentially reduce green-house gas emissions considerably as compared to fossil fuel-based aircraft fuel systems. Thus, there is a need for development in the area of hydrogen fuel systems for aircraft and other applications.

SUMMARY

The present disclosure relates to hydrogen pumping systems for pumping hydrogen from a fuel tank (where the hydrogen is stored as liquid hydrogen LH2) to a power generation device at which the hydrogen is used as fuel. The pumping systems include features providing system redundancy, effective heat exchange for warming the hydrogen, gas turbine air bleed cooling, component cooling and removal of hydrogen gas.

Aspects of the present disclosure relate to hydrogen pumping systems for pumping hydrogen from a fuel tank (where the hydrogen is stored as liquid hydrogen LH2) to a power generation device at which the hydrogen is used as fuel. Example combustion-based power generation devices include gas turbine engines (e.g., gas turbine engines for providing aircraft propulsion) and internal combustion engines. Example electrochemical-based power generation devices include fuel cells (e.g., a fuel cell for power generation at an auxiliary power unit (APU) of an aircraft).

In certain examples, the LH2 may be stored at low temperatures (e.g., cryogenic temperatures) in the fuel tank and can be pressurized. In certain examples, the relatively low temperature of the hydrogen can be used to provide cooling of system components. In one example, the hydrogen is pumped toward the power generation device by a hydraulic pump (e.g., a centrifugal pump) driven by an electric motor, and the hydrogen is used to provide cooling of the electric motor by routing the hydrogen through a cooling passage (e.g., a cooling sleeve/jacket) the flows along and/or through a casing/housing of the electric motor and extracts heat generated by the electric motor. In one example, the hydrogen is used to cool bleed gas from a gas turbine engine (e.g., a gas turbine engine of an aircraft). The cooled bleed gas can be used to provide cooling of a combustion chamber of the gas turbine engine, turbines of the gas turbine engine and engine oil of the gas turbine engine; and can also be used for air conditioning of the aircraft cabin or other aircraft functions. In certain examples, the bleed gas can be sourced from a compressor of the gas turbine engine at an early compression stage (e.g., for lower pressures) and/or at a later compression stage (e.g., for higher pressures). In certain examples, the bleed gas can be routed through a heat exchanger through which the hydrogen is pumped such that the hydrogen extracts heat from the bleed gas (e.g., the hydrogen is warmed by the bleed gas and the bleed gas is cooled by the hydrogen).

In certain examples, the hydrogen pumping system can include a fuel pump for pumping the hydrogen toward the power generation device. The fuel pump can be located outside of the tank where the LH2 is stored, and a boost pump (or a plurality of boost pumps) can be provided in the tank for pumping LH2 to a pump inlet of the fuel pump. A vacuum line can be provided for removing hydrogen gas from the pump inlet prior to start-up of the fuel pump. In one example, the vacuum line can also draw hydrogen from a casing of the fuel pump. In one example, the fuel pump is powered by an electric motor, and the vacuum line can be configured to draw hydrogen through a cooling structure of the electric motor. In one example, the vacuum line includes a vacuum pump that directs hydrogen to a fuel cell (e.g., a fuel cell for providing power at an APU), back to tank, and/or back to the fuel line at a location downstream from the fuel pump. In one example, the hydrogen pumping system can include a heat exchanger through which hydrogen is pumped by the fuel pump to provide warming of the hydrogen prior to use (e.g., combustion) at the power generation device and to provide cooling of a fluid directed elsewhere in the system where cooling is desired. In one example, the power generation device is a gas turbine engine, and the fluid is bleed air supplied from a compressor of the gas turbine engine. In one example, prior to start-up of the fuel pump, the vacuum pump directs hydrogen (e.g., including evacuated hydrogen gas from the fuel pump inlet) back to the fuel line at a location downstream of the heat exchanger. In one example, a flow modulating and shutoff valve can be provided along the fuel line at a location between the heat exchanger and the power generation device. In one example, mass flow sensing, temperature sensing and/or pressure sensing of the hydrogen in the fuel line is implemented at a location between the heat exchanger and the flow modulating and shutoff valve.

In certain examples, the hydrogen pumping system can include a fuel pump powered by two or more electric motors coupled to the fuel pump by a gear arrangement (e.g., a gear set such as a planetary gear set). The fuel pump can include a centrifugal pump such as a volute pump or a volute pump with a diffuser. The fuel pump can have multiple stages. The electric motors can be cooled by the hydrogen tapped from the fuel line or directed from the pump outlet through a casing housing the electric motors.

A variety of additional aspects will be set forth in the description that follows. The aspects can relate to individual features and to combinations of features. It is to be understood that both the foregoing general description and the following detailed description are exemplary and explanatory only and are not restrictive of the broad concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Aspects of the present disclosure relate to a pumping system for providing hydrogen to a power generating device configured to use hydrogen as fuel. In one example, the hydrogen is stored in a tank (e.g., at cryogenic temperatures) as liquid hydrogen LH2. In certain examples, the hydrogen warms as the hydrogen is pumped through the system from the tank to the power generating device. In certain examples, specific structures (e.g., heat exchangers) can be incorporated along the fuel line for warming the hydrogen and concurrently cooling fluid desired to be cooled (e.g., gas turbine bleed air). In certain examples, a boost pump can be provided in the tank to provide at least initial pumping of the hydrogen. Example boost pump configurations are disclosed by U.S. patent application Ser. No. 18/351,449, the disclosure of which is hereby incorporated by reference in its entirety. In certain examples, hydrogen can also be provided to auxiliary structures (fuel cells). An example LH2 fuel system disclosing fuel provided to auxiliary structures is shown and described in co-pending U.S. application Ser. No. 18/305,030, filed Apr. 21, 2023, and titled "Hydrogen Fuel System for Aircraft," the disclosure of which is hereby incorporated herein by reference in its entirety. In certain examples, the system includes a pump driven by multiple motors to provide redundancy. In certain examples, hydrogen is used to provide cooling of the motor or motors used to drive the pump. In certain examples, a vacuum line is provided for removing hydrogen gas from the inlet of the pump (e.g., at pump start-up). In certain examples, a vacuum line is used to draw hydrogen from a casing of the pump and/or to draw hydrogen through a cooling structure used to cool the pump motor. In certain examples, pumping systems in accordance with the principles of the present disclosure can be incorporated into an aircraft. In certain examples, the hydrogen fuel is heated and pressurized to a supercritical fluid before reaching the combustor.

Figure 1:
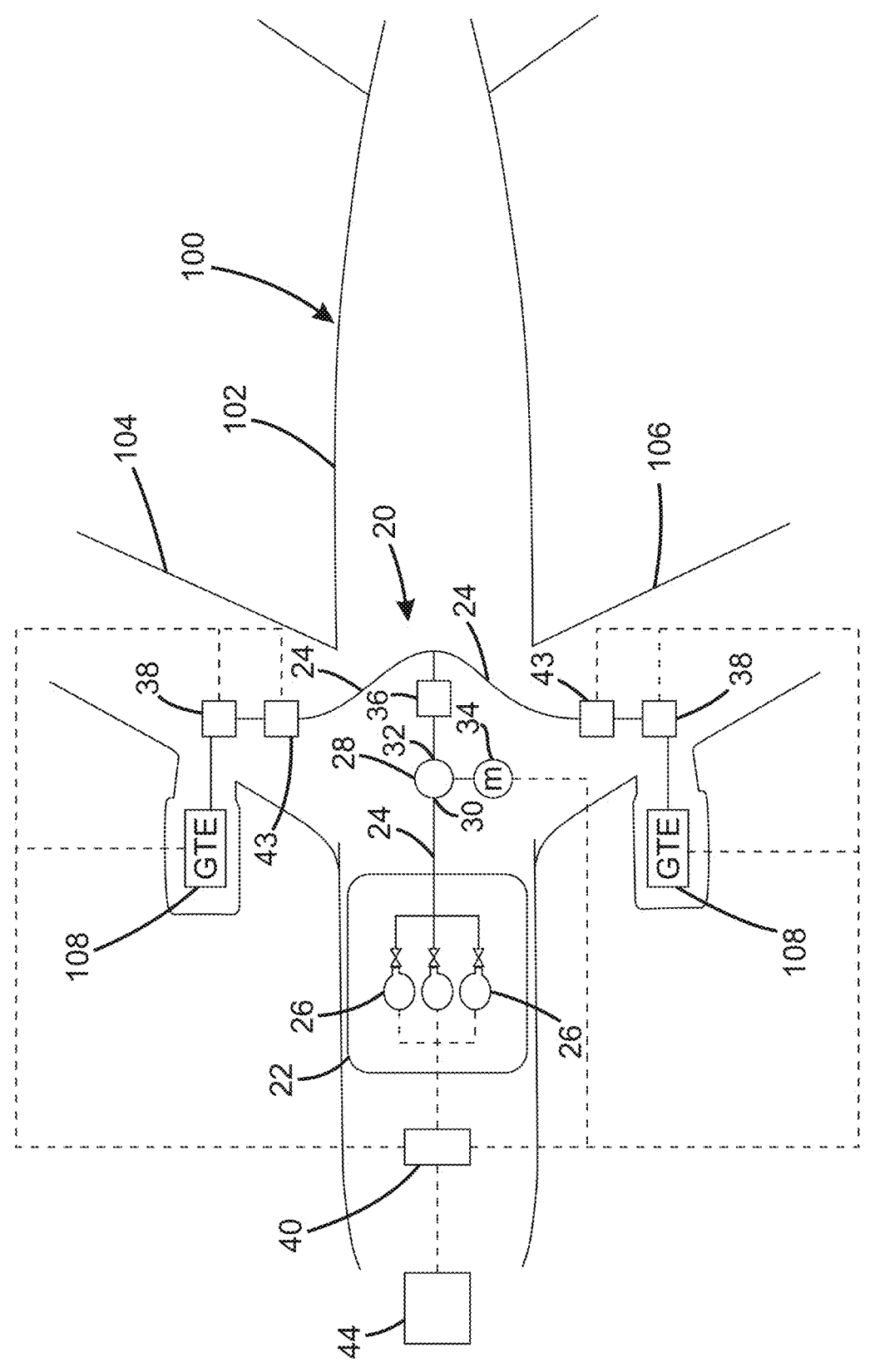
FIG. 1 is a schematic diagram of an aircraft incorporating a main engine fuel pump system in accordance with the principles of the present disclosure.

FIG. 1 illustrates an example aircraft 100 including a hydrogen fuel system 20 in accordance with the principles of the present disclosure. The aircraft 100 includes a fuselage 102 in which a pilot and optionally one or more passengers and/or cargo may be carried. For example, the fuselage may include a cockpit, cabin, and/or cargo hold. The aircraft 100 also includes first and second wings 104, 106. Each wing 104, 106 carries one or more gas turbine engines 108 (e.g., a gas turbine engine such as a Turbofan engine). The engines 108 are configured to generate thrust for propelling the aircraft 100 forward. The hydrogen fuel system 20 includes at least one fuel tank 22 in which to store hydrogen fuel. The hydrogen fuel system 20 is configured to transfer hydrogen from the fuel tank 22 to the gas turbine engines 108. The hydrogen fuel system 20 can be configured to pressurize and warm the hydrogen fuel to generate flow from the fuel tank 20 to the gas turbine engines 108 and to provide the hydrogen in a supercritical form suitable for effective combustion within combustors of the gas turbine engines 108. The pumps, valves and conduits of the system can be insulated to reduce heat transfer.

Figure 3:
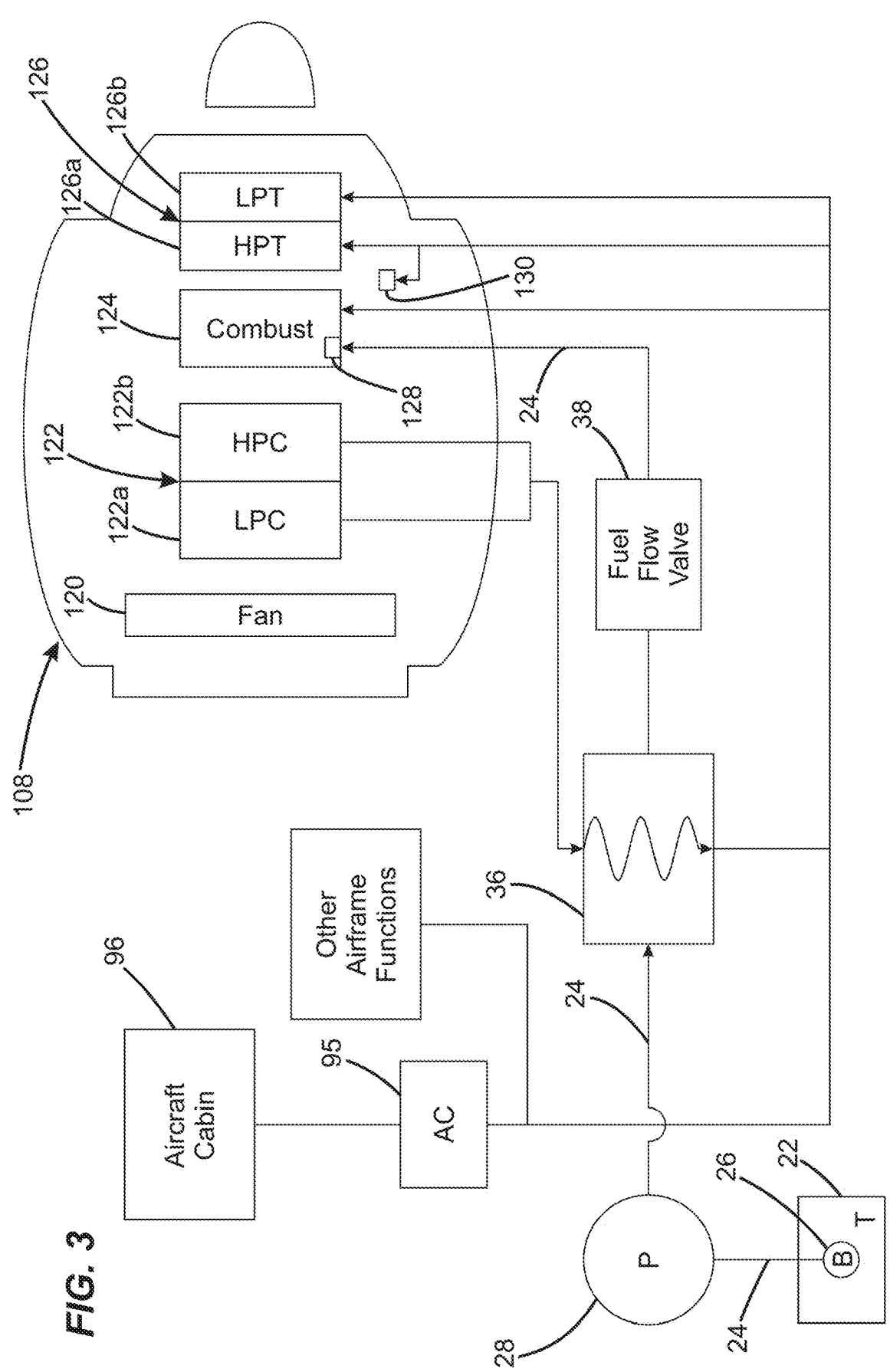
FIG. 3 is a schematic depicting a gas turbine engine bleed air cooling configuration in accordance with principles of the present disclosure.

FIG. 3 schematically shows one of the gas turbine engines 108. The gas turbine engine 108 includes a main fan 120, a compressor 122 having a low-pressure region 122*a* and a high-pressure region 122*b*, a combustor 124 and a turbine 126 having a high-pressure region 126*a* and a low-pressure region 126*b*. The terms "high" and "low" are meant to be relative with respect to each other and the respective regions. The main fan 120 is mechanically driven by the turbines corresponding to the low-pressure region 126*b* (e.g., the fan 120 is rotated by torque generated by the turbines which is transferred to the fan 120 by shafts, gears, etc.). Rotation of the fan 120 by the turbines generates by-pass air flow that by-passes the combustor 124 and generates thrust for propulsion of the aircraft. The compressor 122 is mechanically driven by turbines corresponding to the high-pressure region 126*a* and functions to compress combustion air that is fed into a combustion chamber of the combustor 122. The combustor 122 can include fuel injectors 128 for injecting the hydrogen into the combustion chamber for combustion. Gas expansion caused by combustion in the combustion chamber of the combustor 124 drives rotation of the turbine 126. Moving mechanical parts of the gas turbine engine 108 can be lubricated by engine oil 130.

The tank 22 is configured to hold hydrogen in a primarily liquid state. Portions of the hydrogen fuel may transition to vapor before, during, or after the flight. Systems for maintaining pressurization of the hydrogen fuel within the fuel tank 22 are described in co-pending U.S. application Ser. No. 18/305,030, filed Apr. 21, 2023, and titled "Hydrogen Fuel System for Aircraft," the disclosure of which has been hereby incorporated herein by reference in its entirety. In certain implementations, the fuel tank 22 is configured to hold the liquid hydrogen at a pressure ranging between 18 pounds per square inch absolute (psia) and 24 psia. In certain implementations, the fuel tank 22 is configured to maintain the liquid hydrogen at a temperature between 18 degrees Kelvin (K) and 25K. The tank 22 is preferably sufficiently insulated to maintain the hydrogen fuel within an acceptable temperature range (e.g., between 18K-25K).

Referring to FIG. 1, the hydrogen fuel system 20 includes a fuel line arrangement 24 for conveying hydrogen from the tank 22 to the gas turbine engines 108. The hydrogen fuel system also includes a pumping configuration for pumping hydrogen through the fuel line arrangement 24. The pumping configuration includes a boost pump 26 positioned within the tank 22 for pumping the hydrogen from the tank 22. As depicted, a plurality (e.g., three) of the boost pumps 26 are provided for redundancy purposes). The pumping configuration of the hydrogen fuel system 20 further includes a fuel pump 28 (e.g., a main fuel pump) located outside of the tank 22. The fuel pump 28 includes a pump inlet 30 that receives hydrogen from the boost pump 26 and a pump outlet 32 that pumps hydrogen through the fuel line arrangement 24 toward the gas turbine engines 108. In one example, the fuel pump is powered by at least one electric motor 34. In one example, the boost pump 26 can have a configuration of the type disclosed by U.S. patent application Ser. No. 18/351,449, the disclosure of which has hereby been incorporated by reference in its entirety. In one example, the fuel pump 28 can be a centrifugal pump such as a volute style centrifugal pump. The pump 28 can be a multi-stage centrifugal pump with each stage including an impeller and a volute as well as a diffuser.

The hydrogen fuel system 20 also includes a heat exchanger 36 positioned along the fuel line arrangement 24 between the fuel pump 28 and the gas turbine engines 108 for heating the hydrogen pumped through the heat exchanger 36 by the fuel pump 28. While in the fuel tank 20, the hydrogel fuel is maintained at a temperature of about 18K-25K. While traveling through the fuel line arrangement 24, the temperature of the hydrogen fuel rises. In certain examples, the hydrogen fuel may have a temperature between 30K and 70K upon reaching the heat exchanger 36. In certain examples, the hydrogen fuel may have a temperature between 40K and 60K upon reaching the heat exchanger 36. In an example, the hydrogen fuel has a temperature around 50K upon reaching the heat exchanger 36. However, this raise in temperature is not sufficient to allow injection of the hydrogen fuel into the combustor without increasing the combustion instability. Further, injecting such cold hydrogel into the combustor may increase the specific fuel consumption of the combustor. Accordingly, the heat exchanger 36 further heats the hydrogen fuel to a temperature appropriate for use within the combustor (e.g., at least 100K, at least 200K, at least 250K, at least 280K, at least 290, or at least 300K).

Figure 2:
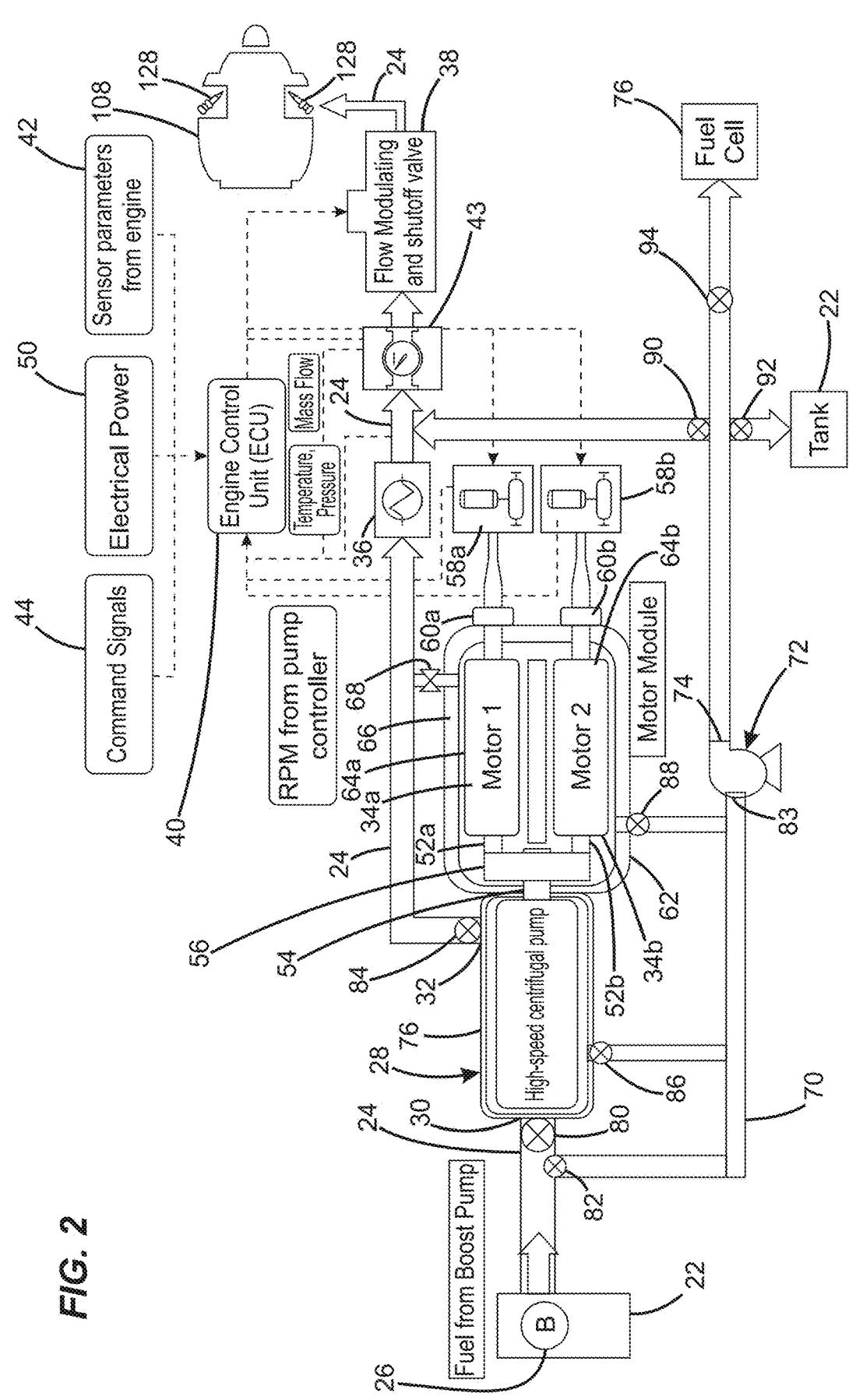
FIG. 2 is a more detailed schematic depicting example portions of the main engine fuel pump system of FIG. 1.

The hydrogen fuel system 20 further includes valves 38 positioned between the heat exchanger 36 and the gas turbine engine 108 for controlling a flow of hydrogen to the fuel injectors 128 of the combustors 124 of the gas turbine engine 108. In one example, the valves 38 are a flow modulating valves with shut-off functionality. The valves 38 can be controlled by an engine control unit 40. The engine control unit 40 can be configured to interface with sensors 42 from the gas turbine engines 108 and can receive control signals from a command source 44 such as the main control interface provided in the cockpit of the aircraft. The engine control unit 40 (e.g., a processing unit) can also control a motor controller of the electric motor 34 and can interface with fuel sensors 42 for sensing parameters of the hydrogen fuel in the fuel line such as mass flow, temperature and pressure which are used to control the fuel output of the valves 38. The fuel sensors 43 can be positioned along the fuel line arrangement 24 between the heat exchanger 36 and the valves 38 and as shown at FIG. 2 can include mass flow sensors, temperature sensors and pressure sensors. An electrical power source 50 can power the engine control unit 40. The engine control unit 40 can dictate the physical characteristics (e.g., mass flow, pressure, temperature) of the hydrogen provided to the combustor from the valve 38. Depending upon the various sensed engine parameters, sensed fuel parameters, sensed pump parameters (e.g., pump RPM) and the thrust demand, the engine controller 40 modulates the valve 38 to provide the desired hydrogen flow to the gas turbine engine 108. The pump speed and/or displacement can also be controlled by the engine controller 40 to meet thrust demand or other demands.

Referring to FIG. 2, the hydrogen fuel system 20 can include first and second electric motors 34a, 34b for powering the fuel pump 28. The first and second electric motors 34a, 34b can have separate output shafts 52a, 52b that are mechanically coupled to an input shaft 54 of the fuel pump 28 by a gear set 56. In one example, the gear set 56 is a planetary gear set. The first and second electric motors 34a, 34b are respectively controlled by first and second motor controllers 58a, 58b that are separate from each other and that interface with the engine control unit 40. The controllers 58a, 58b can electrically connect to the electric motors 34a, 34b via connectors 60a, 60b that mate with corresponding connectors provided on a motor housing 62 in which the first and second motors 34a, 34b are housed. In one example, the motor housing 62 is a multi-chamber housing and the first and second electric motors 34a, 34b are housed within separate first and second chambers 64a, 64b of the motor housing 62. The gear set 56 can also be housed within the motor housing 62. The motor housing 62 can be hermetic and insulated. The pumps, valves and conduits of the system can be insulated to reduced heat transfer.

The first and second electric motors 34a, 34b can be cooled by hydrogen from the fuel line arrangement 24. For example, the motor housing 62 can define a cooling passage 66 (e.g., a cooling sleeve or jacket or an arrangement of passages) through which the hydrogen flows. In one example, a portion of the fuel line arrangement can flow through or along the housing 62. As depicted, the hydrogen that flows through the cooling passage 66 is tapped from the hydrogen in the fuel line arrangement 24 at a location downstream from the pump outlet 32. Flow through the cooling passage 66 can be controlled by a valve 68 such as an orifice valve or can be a fixed sized orifice that limits flow through the cooling passage 66. The hydrogen fuel system 20 further includes a vacuum line 70 that draws hydrogen from the cooling passage 66. The vacuum line 70 includes a vacuum pump 72 having an outlet 74 that directs hydrogen to a fuel cell 76, back to the tank, or back to the fuel line arrangement 24 at a location between the heat exchanger 36 and the valve 38.

The vacuum line 70 can also be configured for drawing hydrogen gas from adjacent the pump inlet 30 prior to initiating a start-up of the fuel pump 28. The vacuum line 70 can further be configured for drawing hydrogen from a casing 76 of the fuel pump 28 (e.g., to manage hydrogen leakage). Valves can be located within the system for opening and closing various portions of the system. Valve 80 can open and close fluid communication between the pump inlet 32 and the boost pump 26/tank 22. Valve 82 can open and close fluid communication between an inlet 83 of the vacuum pump 72 and a region of the fuel line arrangement 24 adjacent the pump inlet 30 (e.g., upstream from the valve 80). Valve 84 opens and closes fluid communication between the pump outlet 32 and the heat exchanger 36. Valve 86 opens and closes fluid communication between the casing 76 and the inlet 83 of the vacuum pump 72. Valve 88 opens and closes fluid communication between the cooling passage 66 and the inlet 83 of the vacuum pump 72. Valve 90 opens and closes fluid communication between the fuel line 24 and the outlet 74 of the vacuum pump 72. Valve 92 opens and closes fluid communication between the tank 22 and the outlet 74 of the vacuum pump 72. Valve 94 opens and closes fluid communication between the fuel cell 76 and the outlet 74 of the vacuum pump 72. During evacuation of hydrogen gas from adjacent the pump inlet 30 prior to start-up of the fuel pump 28, valves 80, 84, 92, 68 and 94 are closed and valves 82, 86, 88 and 90 are open. In this way gaseous hydrogen can be provided to the gas turbine engine during engine start. During normal running of the fuel pump 28, valves 82 and 90 are closed and valves 80, 84, 86, 88, 68 and 92 or 94 are open.

Referring to FIG. 3, the heat exchanger 36 is configured to transfer heat from bleed air sourced from the compressor 122 (either or both the low-pressure 122a and the high pressure 122b) of the gas turbine engine 108 to the hydrogen in the fuel line 24. The bleed air is cooled in the heat exchanger 36, and the cooled bleed air is used to provide turbine cooling at the gas turbine engine (e.g., at either or both the high and low pressure regions 126a, 126b), or engine oil 130 cooling at the gas turbine engine or combustion chamber cooling at the gas turbine engine 108. The cooler air can also be conveyed to an air conditioning system 95 for conditioning air directed into a cabin 96 of the aircraft on which the gas turbine engines 108 are mounted. Air flow valves can be provided for modulating air flow as needed and opening and closing the various depicted airflow pathways.

ASPECTS

Aspect 1. A fuel system for supplying hydrogen to a gas turbine engine, the fuel system comprising:
- a tank for containing hydrogen in a liquid form;
- a fuel line that extends from the tank to the gas turbine engine;
- a pump for pumping the hydrogen through the fuel line in a direction from the tank toward the gas turbine engine;
- a heat exchanger positioned along the fuel line between the pump and the gas turbine engine for heating the hydrogen pumped through the heat exchanger by the pump; and
- a valve positioned between the heat exchanger and the gas turbine engine for controlling a flow of hydrogen to an injector of a combustor of the gas turbine engine.

Aspect 2. The fuel system of aspect 1, wherein the pump is positioned in the tank.

Aspect 3. The fuel system of aspect 2, wherein the pump is a boost pump, and wherein the fuel system further comprises a fuel pump outside of the tank, the fuel pump including a pump inlet that receives hydrogen from the boost pump and a pump outlet that pumps hydrogen toward the heat exchanger.

Aspect 4. The fuel system of aspect 3, wherein the fuel pump is powered by at least one electric motor.

Aspect 5. The fuel system of aspect 3, wherein the fuel pump is powered by at least two electric motors coupled to the fuel pump by a gear set.

Aspect 6. The fuel system of aspect 5, wherein the at least two electric motors include first and second electric motors respectively controlled by first and second motor controllers that are separate from one another.

Aspect 7. The fuel system of aspect 4 or 5, wherein the electric motor or motors are cooled by hydrogen from the fuel line.

Aspect 8. The fuel system of aspect 7, wherein the electric motor or motors are contained within a housing defining a cooling passage through which the hydrogen flows.

Aspect 9. The fuel system of aspect 3, further comprising a vacuum line for drawing hydrogen gas from adjacent the pump inlet prior to initiating a start-up of the fuel pump.

Aspect 10. The fuel system of aspect 9, wherein the vacuum line draws hydrogen from a casing of the fuel pump.

Aspect 11. The fuel system of aspect 9 or 10, wherein the fuel pump is powered by an electric motor, wherein the electric motor is cooled by hydrogen from the fuel line, wherein the electric motor is contained in a housing defining a cooling passage through which the hydrogen flows, and wherein the vacuum line draws hydrogen from the cooling passage.

Aspect 12. The fuel system of aspect 11, wherein the hydrogen that flows through the cooling passage is tapped from the hydrogen output from the fuel pump and flow through the cooling passage is controlled by an orifice valve.

Aspect 13. The fuel system of any of aspects 9-12, wherein the vacuum line includes a vacuum pump having an outlet that directs hydrogen to a fuel cell, and/or back to the tank, and/or back to the fuel line at a location between the heat exchanger and the valve.

Aspect 14. The fuel system of aspect 1, wherein the heat exchanger is configured to transfer heat from bleed air sourced from a compressor of the gas turbine engine to the hydrogen in the fuel line.

Aspect 15. The fuel system of aspect 14, wherein the bleed air is cooled in the heat exchanger, and the cooled bleed air is used to provide turbine cooling at the gas turbine engine, or engine oil cooling at the gas turbine engine or combustion chamber cooling at the gas turbine engine, or is conveyed to an air conditioning system for conditioning air directed into a cabin of an aircraft on which the gas turbine engine is mounted.

Aspect 16. The fuel system of aspect 1, wherein the valve is a flow modulating valve with shut-off functionality.

Aspect 17. The fuel system of aspect 16, wherein hydrogen mass flow is sensed in the fuel line by a fuel mass flow sensor between the heat exchanger and the valve and/or wherein temperature is sensed in the fuel line by a fuel temperature sensor between the heat exchanger and the valve and/or wherein pressure is sensed in the fuel line by a fuel pressure sensor between the heat exchanger and the valve.

Aspect 18. The fuel system of aspect 17, further comprising an engine control unit that interfaces with the valve, the fuel temperature sensor, the fuel mass flow sensor, the fuel pressure sensor, a command source, sensors from the gas turbine engine, and motor controller for controlling an electric motor that drives the pump.

Aspect 19. A fuel system for supplying hydrogen to a power generation device, the fuel system comprising:
- a tank for containing hydrogen in a liquid form;
- a fuel line that extends from the tank to the power generation device;
- a pump for pumping the hydrogen through the fuel line in a direction from the tank toward the power generation device; and
- first and second electric motors for powering the pump, the first and second electric motors being mechanically coupled to an input shaft of the pump by a gear set.

Aspect 20. The fuel system of aspect 19, wherein the gear set is a planetary gear set.

Aspect 21. The fuel system of aspect 19 or 20, wherein the first and second electric motors are respectively controlled by first and second motor controller that are separate from each other.

Aspect 22. The fuel system of aspect 19, wherein the pump is a centrifugal pump.

Aspect 23. The fuel system of aspect 22, wherein the centrifugal pump is a multi-stage volute centrifugal pump with a diffuser.

Aspect 24. The fuel system of aspect 19, wherein the first and second motors are housed in separate chambers of a multi-chamber housing, and wherein the housing defines a cooling structure through which hydrogen from the fuel line flows to provide cooling of the first and second electric motors.

Aspect 25. A fuel system for supplying hydrogen to a power generation device, the fuel system comprising:
- a tank for containing hydrogen in a liquid form;
- a fuel line that extends from the tank to the power generation device;
- a pump for pumping the hydrogen through the fuel line in a direction from the tank toward the power generation device; and
- at least one electric motor for powering the pump, wherein the electric motor is cooled by hydrogen from the fuel line.

Aspect 26. The fuel system of aspect 26, wherein the electric motor is cooled by hydrogen from the fuel line, wherein the electric motor is contained in a housing defining a cooling passage through which the hydrogen flows.

Aspect 27. The fuel line of aspect 26, wherein a vacuum line draws hydrogen from the cooling passage.

Aspect 28. The fuel system of aspect 26, wherein the hydrogen that flows through the cooling passage is tapped from the hydrogen output from the fuel pump and flow through the cooling passage is controlled by an orifice valve.

Aspect 29. The fuel system of aspect 27, wherein the vacuum line includes a vacuum pump having an outlet that directs hydrogen to a fuel cell, and/or back to the tank, and/or back to the fuel line at a location downstream from the pump.

Aspect 30. A fuel system for supplying hydrogen to a power generation device, the fuel system comprising:

a tank for containing hydrogen in a liquid form;

a fuel line that extends from the tank to the power generation device;

a boost pump positioned in the tank;

a fuel pump positioned outside of the tank, the fuel pump including a pump inlet that receives hydrogen from the boost pump and a pump outlet that pumps hydrogen toward the power generation device; and a vacuum line for drawing hydrogen gas from the fuel line adjacent the pump inlet prior to initiating a start-up of the fuel pump.

Aspect 31. The fuel system of aspect 30, wherein the vacuum line includes a vacuum pump having an outlet that directs hydrogen to a fuel cell, and/or back to the tank, and/or back to the fuel line at a location downstream from the fuel pump.

Aspect 32. A fuel system for supplying hydrogen to a gas turbine engine, the fuel system comprising:

a tank for containing hydrogen in a liquid form;

a fuel line that extends from the tank to the gas turbine engine;

a pump for pumping the hydrogen through the fuel line in a direction from the tank toward the gas turbine engine;

a heat exchanger positioned along the fuel line between the pump and the gas turbine engine for heating the hydrogen pumped through the heat exchanger by the pump;

wherein the heat exchanger is configured to transfer heat from bleed air sourced from a compressor of the gas turbine engine to the hydrogen in the fuel line.

Aspect 33. The fuel system of aspect 32, wherein the bleed air is cooled in the heat exchanger, and the cooled bleed air is used to provide turbine cooling at the gas turbine engine, or engine oil cooling at the gas turbine engine or combustion chamber cooling at the gas turbine engine, or is conveyed to an air conditioning system of an aircraft on which the gas turbine engine is mounted.

In certain other embodiments, only the main fuel pump and not the boost pumps can be provided for moving hydrogen from the tank through the heat exchanger to the power generation device. Alternatively, in other embodiments, only the boost pump or boost pumps and not the main fuel pump can be provided for moving hydrogen from the tank through the heat exchanger to the power generation device.

While particular uses of the technology have been illustrated and discussed above, the disclosed technology can be used with a variety of environments in accordance with many examples of the technology. The above discussion is not meant to suggest that the disclosed technology is only suitable for implementation within the environments shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art. As should be appreciated, the various aspects described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process or method are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or operations are disclosed only as illustrative aspects.

What is claimed is:

1. A fuel system for supplying hydrogen to a gas turbine engine, the fuel system comprising:

a tank for containing the hydrogen in a liquid form;

a fuel line that extends from the tank to the gas turbine engine;

a boost pump for pumping the hydrogen through the fuel line in a direction from the tank toward the gas turbine engine;

a heat exchanger positioned along the fuel line between a fuel pump and the gas turbine engine for heating the hydrogen pumped through the heat exchanger by the fuel pump;

a valve positioned between the heat exchanger and the gas turbine engine for controlling a flow of the hydrogen to an injector of a combustor of the gas turbine engine;

the fuel pump outside of the tank, the fuel pump including a fuel pump inlet that receives the hydrogen from the boost pump and a fuel pump outlet that pumps the hydrogen toward the heat exchanger; and a vacuum line positioned adjacent to the fuel pump inlet for drawing the hydrogen-away from the fuel pump inlet prior to initiating a start-up of the fuel pumps, wherein the vacuum line includes a vacuum pump having a vacuum pump outlet that directs the hydrogen to a fuel cell, directs the hydrogen, back to the tank, and directs the hydrogen to the fuel line at a location between the heat exchanger and the valve and, wherein a plurality of valves direct the hydrogen from the vacuum pump outlet to at least one of the fuel cell, the tank, and the fuel line.

2. The fuel system of claim 1, wherein the boost pump is positioned in the tank.

3. The fuel system of claim 1, wherein the fuel pump is powered by at least one electric motor.

4. The fuel system of claim 3, wherein the electric motor is cooled by the hydrogen from the fuel line.

5. The fuel system of claim 1, wherein the fuel pump is powered by at least two electric motors coupled to the fuel pump by a planetary gear set.

6. The fuel system of claim 5, wherein the at least two electric motors include first and second electric motors respectively controlled by first and second motor controllers that are separate from one another.

7. The fuel system of claim 1, wherein the vacuum line draws the hydrogen from a housing of the fuel pump.

8. The fuel system of claim 1, wherein the fuel pump is powered by an electric motor, wherein the electric motor is cooled by the hydrogen from the fuel line, wherein the electric motor is contained in a housing defining a cooling passage through which the hydrogen flows, and wherein the vacuum line draws the hydrogen from the cooling passage.

9. The fuel system of claim 1, wherein the heat exchanger is configured to transfer heat from a bleed air sourced from a compressor of the gas turbine engine to the hydrogen in the fuel line.

10. The fuel system of claim 9, wherein the bleed air is cooled in the heat exchanger to provide a cooled bleed air is used to turbine cooling at the gas turbine engine, or engine oil cooling at the gas turbine engine or combustion chamber cooling at the gas turbine engine, or is conveyed to an air conditioning system for conditioning air directed into a cabin of an aircraft on which the gas turbine engine is mounted.

11. The fuel system of claim 1, wherein the valve is a flow modulating valve with shut-off functionality.

12. The fuel system of claim 11, wherein a hydrogen mass flow is sensed in the fuel line by a fuel mass flow sensor between the heat exchanger and the valve and/or wherein a temperature is sensed in the fuel line by a fuel temperature sensor between the heat exchanger and the valve and/or wherein a pressure is sensed in the fuel line by a fuel pressure sensor between the heat exchanger and the valve, and wherein the fuel system further comprises an engine control unit that interfaces with the valve, the fuel temperature sensor, the fuel mass flow sensor, the fuel pressure sensor, a command source, sensors from the gas turbine engine, and a motor controller for controlling an electric motor that drives the fuel pump.

13. A fuel system for supplying hydrogen to a gas turbine engine, the fuel system comprising:

a tank for containing the hydrogen in a liquid form;

a fuel line that extends from the tank to the gas turbine engine;

a boost pump for pumping the hydrogen through the fuel line in a direction from the tank toward the gas turbine engine;

a heat exchanger positioned along the fuel line between a fuel pump and the gas turbine engine for heating the hydrogen pumped through the heat exchanger by the fuel pump;

a valve positioned between the heat exchanger and the gas turbine engine for controlling a flow of the hydrogen to an injector of a combustor of the gas turbine engine, the fuel pump outside of the tank, the fuel pump including a fuel pump inlet that receives the hydrogen from the boost pump and a fuel pump outlet that pumps the hydrogen toward the heat exchanger; and a vacuum line positioned adjacent to the fuel pump inlet for drawing the hydrogen away from the fuel pump inlet prior to initiating a start-up of the fuel pump, wherein the fuel pump is powered by an electric motor, wherein the electric motor is cooled by the hydrogen from the fuel line, wherein the electric motor is contained in a housing defining a cooling passage through which the hydrogen flows, and wherein the vacuum line draws the hydrogen from the cooling passage and, wherein the hydrogen that flows through the cooling passage is tapped from the fuel pump outlet and is controlled by an orifice valve.

14. A fuel system for supplying hydrogen to a gas turbine, the fuel system comprising:

a tank for containing the hydrogen in a liquid form;

a fuel line that extends from the tank to the gas turbine engine;

a boost pump positioned in the tank;

a fuel pump positioned outside of the tank, the fuel pump including a fuel pump inlet that receives the hydrogen from the boost pump and a fuel pump outlet that pumps the hydrogen toward the gas turbine engine; and a vacuum line adjacent the fuel pump inlet to draw the hydrogen away from the fuel pump inlet prior to initiating a start-up of the fuel pump, wherein the vacuum line includes a vacuum pump having a vacuum pump outlet that directs the hydrogen to a fuel cell, directs the hydrogen back to the tank, and directs the hydrogen to the fuel line at a location between a heat exchanger and a valve and, wherein a plurality of valves direct the hydrogen from the vacuum pump outlet to at least one of the fuel cell, the tank, and the fuel line.

* * * * *